United States Patent
Wallrafen

(10) Patent No.: US 7,235,976 B2
(45) Date of Patent: Jun. 26, 2007

(54) SENSOR FOR MEASURING THE POSITION OF AN ACTUATING ELEMENT

(75) Inventor: Werner Wallrafen, Hofheim (DE)

(73) Assignee: Siemens AG, München (DE)

( * ) Notice: Subject to any disclaimer, the term of this patent is extended or adjusted under 35 U.S.C. 154(b) by 0 days.

(21) Appl. No.: 11/389,196

(22) Filed: Mar. 27, 2006

(65) Prior Publication Data
US 2007/0030009 A1    Feb. 8, 2007

(30) Foreign Application Priority Data
Aug. 4, 2005    (DE)    ........................ 10 2005 016 267

(51) Int. Cl.
*F02P 17/00* (2006.01)
(52) U.S. Cl. .................................................... 324/378
(58) Field of Classification Search ................. 324/378
See application file for complete search history.

(56) References Cited

U.S. PATENT DOCUMENTS

| 4,760,824 A | 8/1988 | Sakurai |
| 4,893,502 A | 1/1990 | Kubota et al. |
| 5,482,019 A | 1/1996 | Ausiello et al. |
| 6,012,437 A * | 1/2000 | Radhamohan et al. . 123/568.23 |
| 6,089,535 A | 7/2000 | Mizutani et al. |
| 6,638,025 B2 | 10/2003 | Blass et al. |
| 6,653,968 B1 | 11/2003 | Schneider |
| 2003/0113210 A1 | 6/2003 | Blass et al. |
| 2004/0226356 A1 * | 11/2004 | Myers et al. ............. 73/202.5 |

FOREIGN PATENT DOCUMENTS

| DE | 102 29 760 A1 | 2/2004 |
| WO | WO 95/20840 | 8/1995 |
| WO | WO 2006/008217 A1 | 1/2006 |

OTHER PUBLICATIONS

Hans-Rolf Tränkler; Taschenbuch der Messtechnik mit Schwerpunkt Sensortechnik; pp. 74, 75, picture 10.6; R. Oldenbourg Verlag GmbH; München; Germany; 4th edition; ISBN 3-486-23670-9.

Jörg Fischer; Jens Häussler; ATZ Automobiltechnische Zeitschrift 101 (1999) 4; Intelligente Winkelsensoren; pp. 268, 270, 272, 273, 274; Germany.

Derwent Abstract—WO 2006/008217A1; Jan. 26, 2006; Siemens Aktiengesellschaft, D-80333 München, Germany.

* cited by examiner

*Primary Examiner*—Vincent Q. Nguyen

(57) ABSTRACT

A sensor for measuring the position of an actuating element has at least one position sensor to detect the position at a drive connection, a circuitry connected to the position sensor, and configured to receive signals from the position sensor, a voltage- and signal-carrying line connecting the circuitry and the position sensor, at least one current measuring device connected in the circuitry to the voltage- and signal-carrying line, and an operating voltage source arranged in a circuit formed by the voltage- and signal-carrying line, the at least one position sensor and the at least one current measuring device. A change in current is transmitted, via the voltage- and signal-carrying line via the signals from the at least one position sensor as a function of the position of the actuating element.

11 Claims, 3 Drawing Sheets

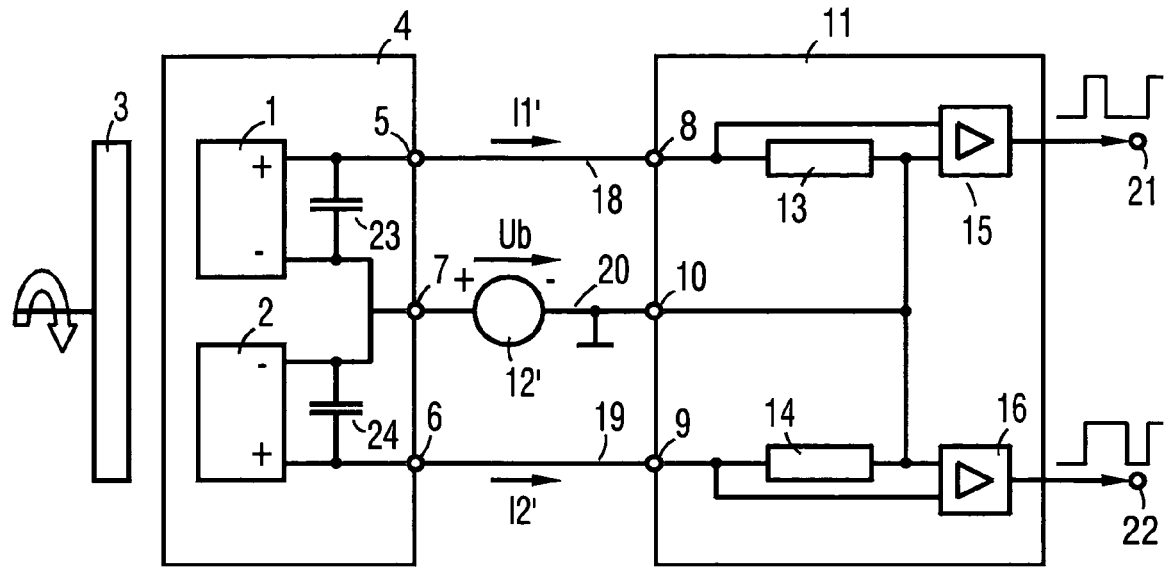
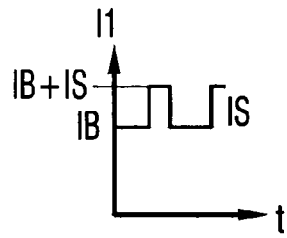
FIG 4A
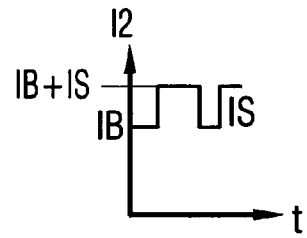
FIG 4B
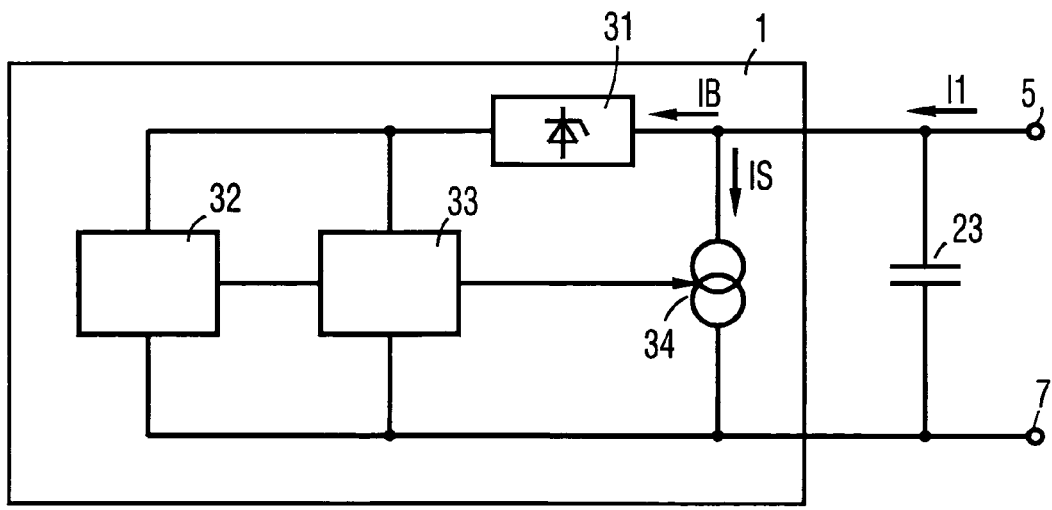

SENSOR FOR MEASURING THE POSITION OF AN ACTUATING ELEMENT

BACKGROUND OF THE INVENTION

The invention relates to a sensor for measuring the position of an actuating element, which is operated electromotively via a drive connection, of an internal combustion engine, at least one position sensor being arranged in the housing of the actuating element, which position sensor detects the position at the drive connection.

Extremely high requirements are placed on sensors of this type with regard to reliability since erroneous functioning or failures may even result in risks under certain circumstances. This relates to both the sensor itself and the electrical connections between the sensor and circuits which supply the sensor with operating voltage and receive and evaluate the output signals from the sensor.

In this case, the cable connections and contact points used for this purpose may represent causes of faults, which may result in serious faults in safety-relevant systems for reasons of redundancy even in the case of a dual embodiment of the sensors and connecting elements. In addition, owing to the increasing use of electronic devices in motor vehicles, the number of cable connections is increasing continuously, and laying a large number of lines is disadvantageous for reasons of cost and weight.

SUMMARY OF THE INVENTION

One object of the present invention is to specify a sensor of the type mentioned initially which is characterized by a high degree of reliability and low costs.

This object is achieved according to the invention by the fact that at least one position sensor is connected to a circuit, which receives signals from the at least one position sensor, the fact that the connection between the circuit and the at least one position sensor takes place by means of a voltage- and signal-carrying line, to which at least one current measuring device is connected in the circuit, the fact that an operating voltage source is arranged in a circuit formed by the line, the at least one position sensor and the at least one current measuring device, and the fact that a change in current is transmitted via the line via the signals from the at least one position sensor as a function of the position of the actuating element.

The sensor according to the invention is advantageously protected against external influences. The sensor itself and line connections up to a plugging apparatus can be produced in a more robust manner which is, nevertheless, inexpensive. In addition, the number of lines required is reduced compared to known sensors.

The invention preferably provides for the change in current to be binary having one current level and another current level, the one current level corresponding to the current flowing through a voltage stabilization circuit in the at least one position sensor and through the operating voltage source, and the other current level corresponding to the current which has been increased by a load, which can be connected as a function of the signals, in the position sensor.

In addition to the savings made on lines, this development of the invention has the advantage that the reliability of transmission at the contacts is increased as a result of the fact that the current through the contacts does not fall below a critical minimum value. As a result, in most cases it is possible to dispense with a gold plating for the contacts.

Furthermore, with the invention contact resistances on lines and contacts do not result in signal changes, as is known in analog signal transmissions.

The binary output signals can be coded in a respectively expedient manner, for example pulse-width-modulated, frequency-modulated, Manchester-coded or using other serial transmission methods. The output signals can comprise not only the output variables from the position sensor but also further data, such as diagnosis and/or temperature. The position sensors themselves may be Hall sensors or function on a magnetoresistive or inductive basis.

In comparison to interfaces with analog signals, the interface provided in accordance with the development has the advantage of increased protection against interference signals. In addition, savings are made as regards analog-to-digital conversion. In addition, it is possible to implement protection against polarity reversal and overvoltage protection in a more simple manner since no ratiometric analog signal is used.

The development can also be configured such that, in the case of a plurality of position sensors, the dependence of the signals on the position of the actuating element is different from position sensor to position sensor. This measure is used for safety reasons in the event that the lines of the two position sensors are short-circuited and that this cannot be identified in the circuit.

One advantageous embodiment of the invention consists in the fact that two position sensors are connected to the circuit via in each case two lines, and the fact that a current measuring device is provided for each position sensor. In contrast to this, the device according to the invention can be designed with reduced redundancy, but also with less outlay on materials, such that two position sensors are connected to the circuit via in each case one line and a common line, and such that a current measuring device is provided for each position sensor.

These developments essentially provide for two sensors to be used, in which case a very high degree of system availability is provided in the case of four lines—compared with six lines using conventional technology—because the system can continue to be operated on one channel (sensor+ lines) for each theoretical fault case.

In addition, the device according to the invention preferably provides for a common moveable element to be associated with the position sensors for position detection purposes.

Another advantageous refinement of the device according to the invention consists in the fact that the current measuring device is formed by a current measuring resistor and a threshold value circuit.

Particularly reliable and mechanically robust embodiments result from the fact that the position sensors are each in the form of an integrated circuit having two connection pins, which are welded to a lead frame, which is embedded in a plastic cover of the housing. Two connection pins can be welded in a more reliable manner using automatic processes than three or more connection pins.

The electromagnetic compatibility can be improved with the device according to the invention by the fact that the connections of the at least one position sensor which are provided for the lines are connected to one another, preferably in the vicinity of the position sensor, by a capacitor. In this case, it is advantageous if the capacitor together with the position sensor has plastic injected around it.

The operating voltage source may be arranged at different points in the circuit. For example, it has proven favorable if the operating voltage source is arranged in the circuit.

One alternative to this consists in the operating voltage source being arranged between the at least one position sensor and the circuit in a line connected to ground. This has the advantage that a ground connection provided in any case can be used such that one or, in the case in which two position sensors are used, two lines are sufficient for the sensor according to the invention. The operating voltage source can in individual cases be a stabilized voltage source or an unstabilized on-board system voltage of a motor vehicle, depending on requirements. In the latter case, the position sensor needs to be correspondingly designed for this purpose.

One further advantage of the two-wire connection consists in the fact that a saving is made of an additional capacitor, which is provided in the case of analog sensors for supplying the supply voltage.

BRIEF DESCRIPTION OF THE SEVERAL VIEWS OF THE DRAWINGS

Exemplary embodiments of the invention are illustrated in the drawing using a plurality of figures and are explained in more detail in the description below. In the drawing:

FIG. 3 shows a third exemplary embodiment,

FIG. 4A and FIG. 4B show timing diagrams of the currents flowing in the lines,

FIG. 5 shows a detailed circuit diagram of a position sensor,

DETAILED DESCRIPTION OF THE INVENTION

Figure 1:
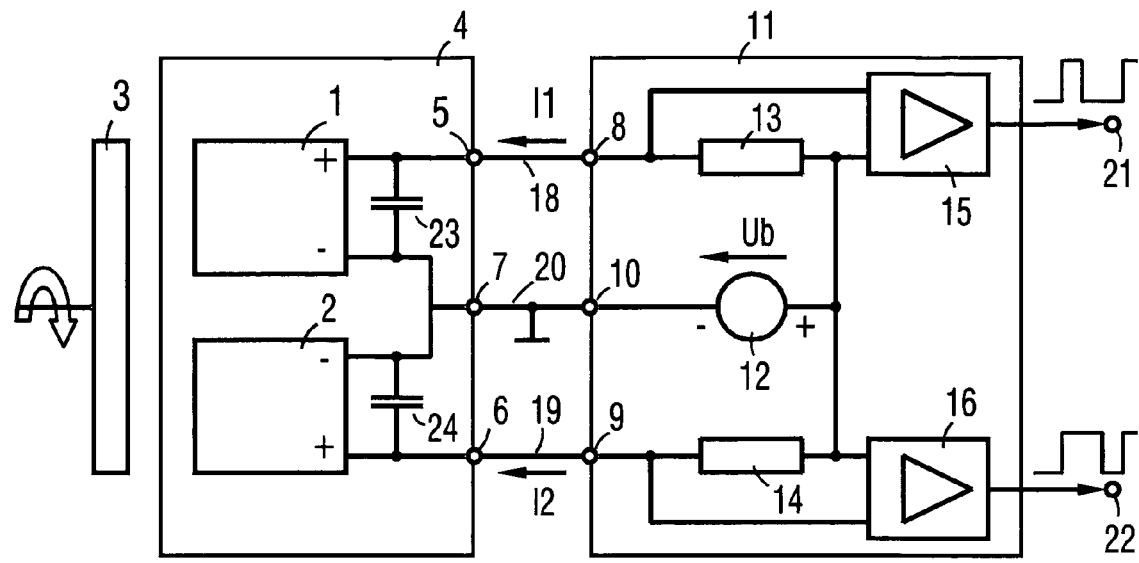
FIG. 1 shows a block diagram of a first exemplary embodiment.

In the exemplary embodiments, two position sensors 1, 2 are used in order to measure the position of a moveable object 3—for example a magnet. Two position sensors are used in order to increase the reliability when measuring the position of safety-relevant apparatuses, for example the throttle valve of a motor vehicle engine. The position sensors, as a module, have a plastic coating 4 injected around them. They each have one connection 5, 6 and a common connection 7. Lines 18, 19, 20 are used for connecting corresponding connections 8, 9, 10 of a circuit 11, which will also be referred to below as an evaluation circuit. The evaluation circuit contains an operating voltage source 12, which is connected to the connections 8, 9 and thus to the lines 18, 19 in each case via a current measuring resistor 13, 14. The voltage drop across the measuring resistors 13, 14 is fed to amplifiers 15, 16 having a threshold value characteristic and hysteresis, signals for further use being available at the outputs 21, 22 of said amplifiers 15, 16.

The connections of the position sensors 1, 2 are bridged by in each case one capacitor 23, 24 in order to filter high-frequency irradiation. The capacitors 23, 24 are dimensioned such that the output signals produced by the position sensors 1, 2 are not impaired.

Figure 2:
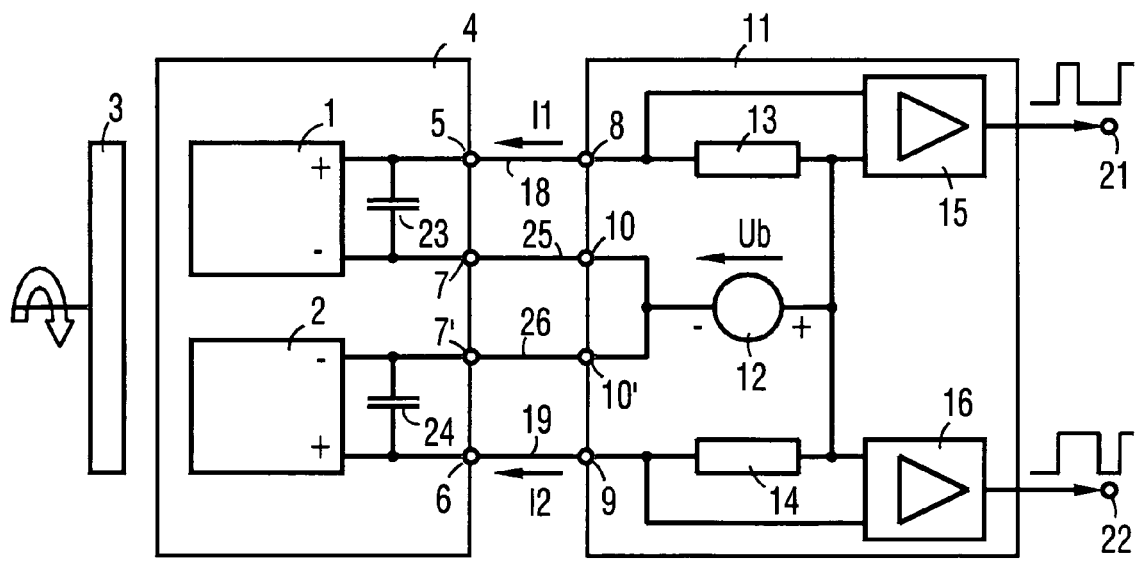
FIG. 2 shows a second exemplary embodiment.

The device shown in FIG. 2 differs from that in FIG. 1 by the fact that in each case one line 25, 26 is used for each position sensor in place of a common line 20 (FIG. 1), said lines 25, 26 being connected to the position sensors 1, 2 or the circuit 11 via connections 7, 10 and 7', 10', respectively. As a result, although the complexity is greater, in the event of a fault on any desired line, the respective other position sensor is still fully functional.

In the exemplary embodiment shown in FIG. 3, the operating voltage source 12' is inserted into the ground line 20 outside the circuit 11. In order that the polarity of the operating voltage follows the usual definition, the minus pole is connected to ground, for which reason the position sensors 1, 2 are connected with opposite polarity and the currents I1' and I2' assume a different direction than in the exemplary embodiments shown in FIGS. 1 and 2.

FIGS. 4A and 4B show the profile of the currents I1 and I2, which each comprise a constant component IB, which is required for operating the position sensor, and a pulsating component IS, which corresponds to the amplitude of the output signal.

FIG. 5 shows a slightly more detailed illustration of the position sensor 1. From the connection 5, the current IB passes to the voltage stabilization circuit 31, which supplies the actual sensor 32 and a signal conditioning circuit 33. Said signal conditioning circuit 33 produces a signal which is suitable for driving a current sink 34 and connects the current IS to the operating current IB in pulsating fashion.

Figure 6:
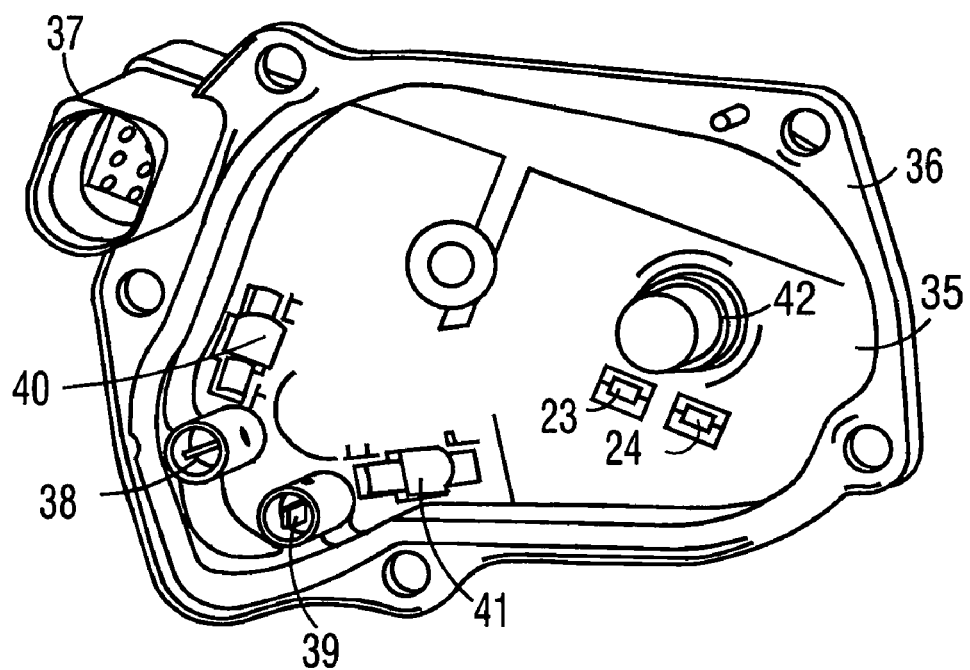
FIG. 6 shows the cover of an electromotively operated actuating element.

FIG. 6 shows the cover 35 of a throttle valve housing (not illustrated). The cover 35 is screwed to the housing using a flange 36. A multiple plugging apparatus 37 is integrally formed on the cover 35. In addition, two plug connectors 38, 39 are located on the cover 35, which form a connection between the servomotor and the plugging apparatus 37 via interference suppression means 40, 41 in the closed state of the housing. Said interference suppression means 40, 41 are embedded in the cover 35 made from plastic, as are lines, in the form of a lead frame, between the plugging apparatus 37 and the interference suppression means 40, 41.

Figure 7:
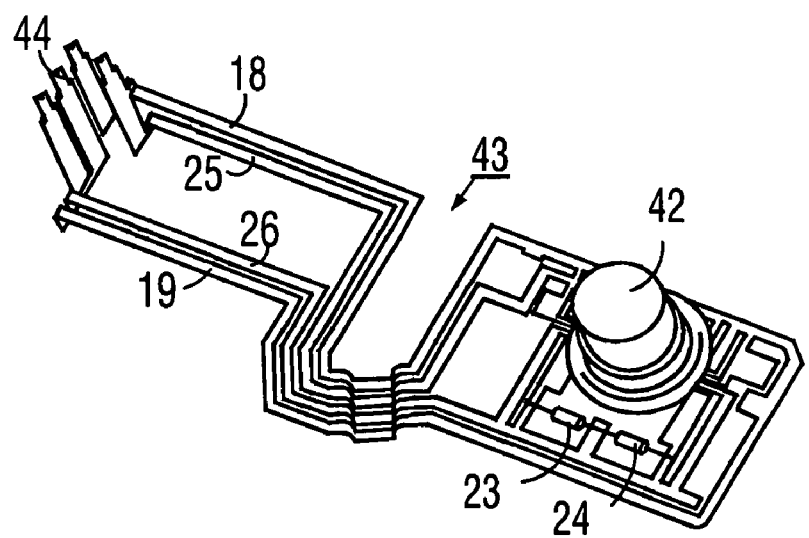
FIG. 7 shows a lead frame embedded in the cover.

A sensor head 42 is arranged in the cover 35 such that it is aligned with the drive connection (not illustrated) of the throttle valve, said sensor head 42 containing two position sensors and likewise being connected to the plugging apparatus 37 by lines 18, 19, 25, 26, which are formed by a lead frame 43 (FIG. 7). At the same time, the lead frame 43 forms contact pins 44 of the plugging apparatus 37. The capacitors 23, 24 are illustrated in FIG. 6 without having had plastic injected around them. However, given the presence of corresponding preconditions, it is also possible for these capacitors 23, 24 to have plastic injected around them.

The invention claimed is:

1. A sensor for measuring a position of an actuating element, which is operated electromotively via a drive connection, of an internal combustion engine, comprising:

at least one position sensor arranged in a housing of the actuating element wherein the position sensor is configured to detect the position at the drive connection;

a circuitry connected to the at least one position sensor, and configured to receive signals from the at least one position sensor;

a voltage- and signal-carrying line connecting the circuitry and the at least one position sensor;

at least one current measuring device connected in the circuitry to the voltage- and signal-carrying line; and an operating voltage source arranged in a circuit formed by the voltage- and signal-carrying line, the at least one position sensor and the at least one current measuring device, wherein a change in current is transmitted via the voltage- and signal-carrying line via the signals from the at least one position sensor as a function of the position of the actuating element, and wherein the change in current is binary having one current level and another current level, the one current level corresponding to the current flowing through a voltage stabilization circuit in the at least one position sensor and through the operating voltage source, and the other current level corresponding to the current increase by a load connectable in the position sensor as a function of the signals.

2. The sensor according to claim 1, wherein the sensor comprises plurality of position sensors, and wherein the dependence of the signals on the position of the actuating element is different from position sensor to position sensor.

3. The sensor according to claim 1, wherein two position sensors are connected to the circuitry, each position sensor via two lines, and wherein a current measuring device is provided for each position sensor.

4. The sensor according to claim 3, wherein a common moveable element is associated with the position sensors for position detection purposes.

5. The sensor according to claim 3, wherein connections of the at least one position sensor, which are provided for the line, are connected to one another by a capacitor.

6. The sensor according to claim 5, wherein the capacitor and the position sensor are surrounded by plastic.

7. The sensor according to claim 1, wherein two position sensors are connected to the circuitry, each position sensor via one line and a common line, and wherein current measuring device is provided for each position sensor.

8. The sensor according to claim 1, wherein the current measuring device is formed by a current measuring resistor and a threshold value circuit.

9. The sensor according to claim 1, wherein the each position sensor is configured as an integrated circuit having two connection pins, which are welded to a lead frame, which is embedded in a plastic cover of the housing.

10. The sensor according to claim 1, wherein the operating voltage source is arranged in the circuitry.

11. The sensor according to claim 1, wherein the operating voltage source is arranged between the at least one position sensor and the circuitry in a line connected to ground.

* * * * *